United States Patent Office 2,957,118
Patented Oct. 18, 1960

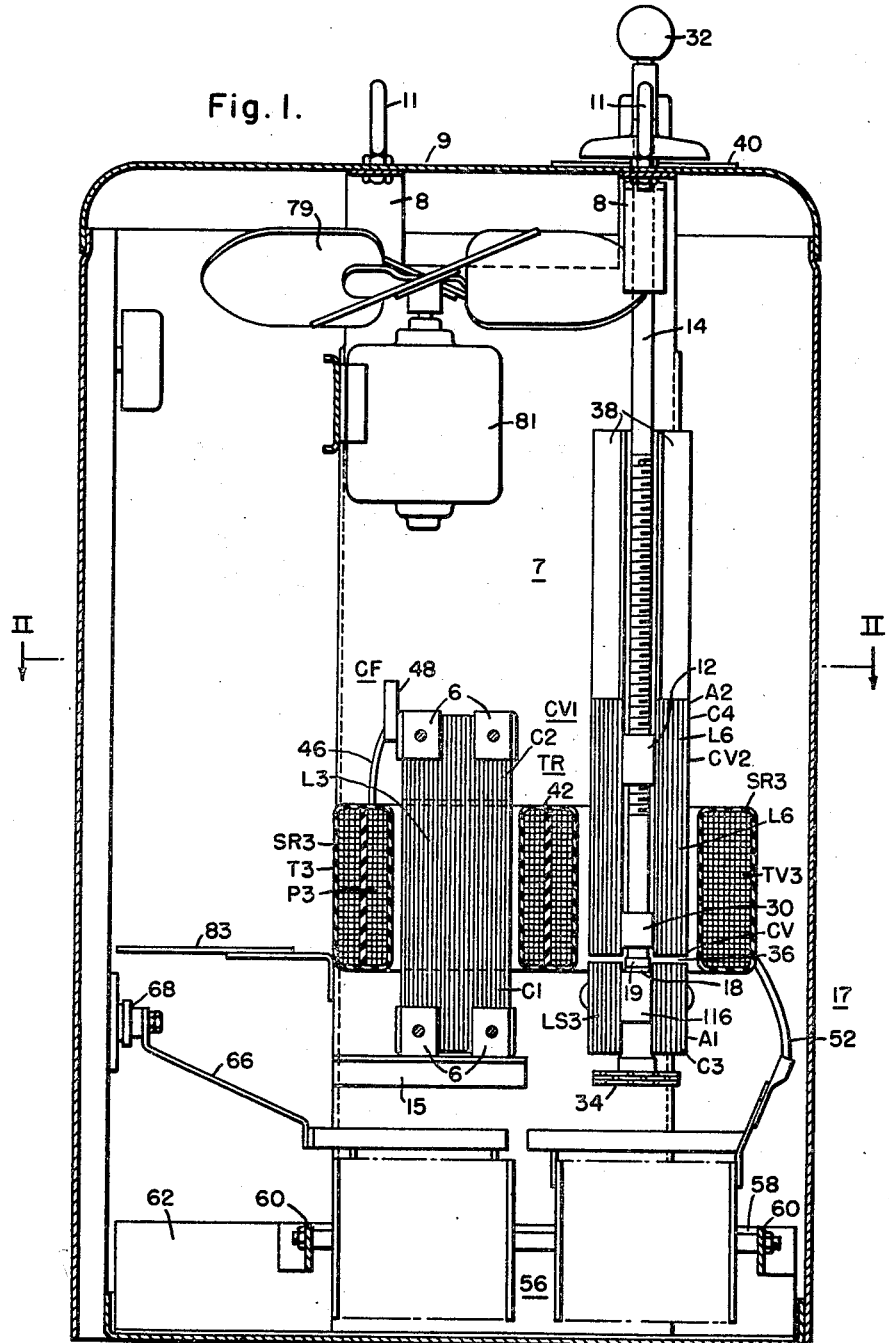

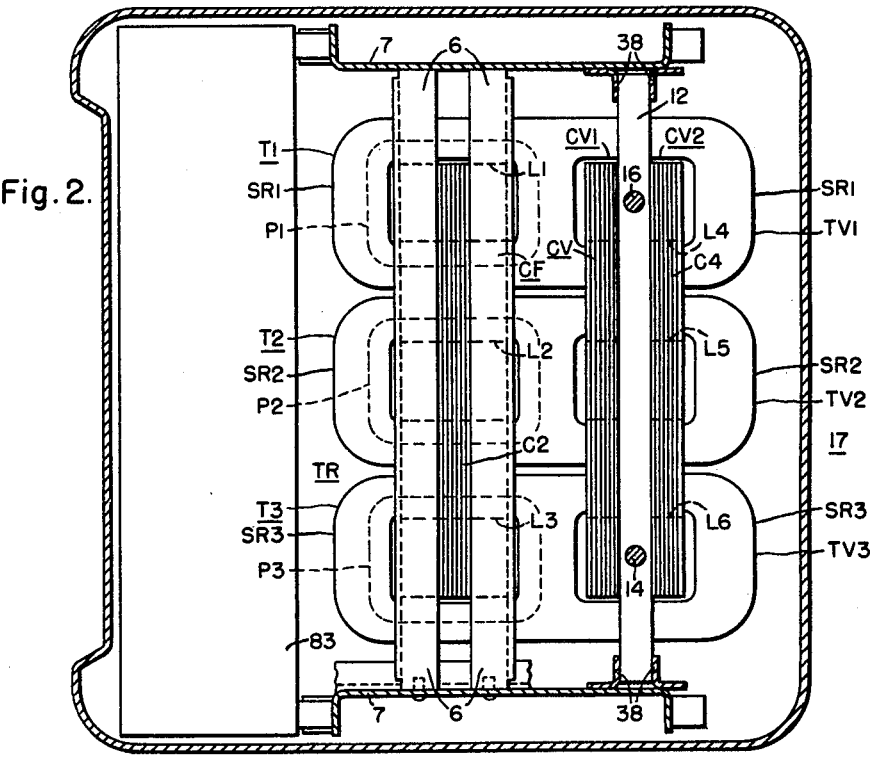
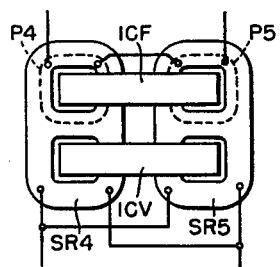
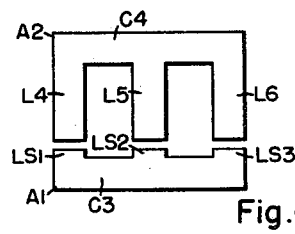
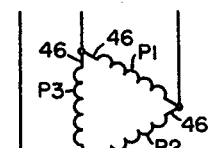
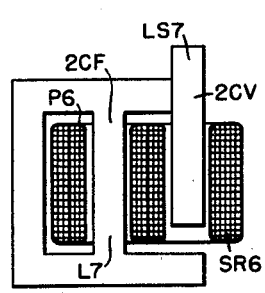
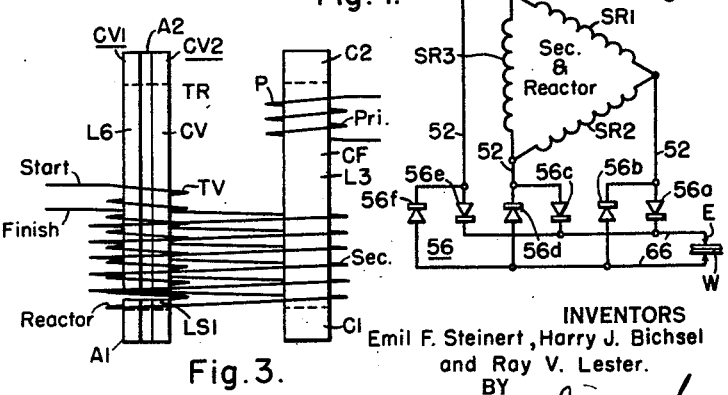

2,957,118

ELECTRIC ARC WELDERS

Emil F. Steinert, Williamsville, Harry J. Bichsel, East Aurora, and Ray V. Lester, Kenmore, N.Y., assignors to Westinghouse Electric Corporation, East Pittsburgh, Pa., a corporation of Pennsylvania Filed May 25, 1953, Ser. No. 357,321

18 Claims. (Cl. 321—16)

Our invention relates to power converting apparatus and has particular relation to arc welders both of the direct-current and the alternating current type.

As regards direct-current welders, our invention is an improvement over that disclosed in Patent 2,752,529, dated June 26, 1956, to Charles P. Croco, Charles H. Jennings, Ray Verne Lester and Emil F. Steinert, and assigned to the Westinghouse Electric Corporation which will be called hereinafter the Croco patent. In this Croco patent, direct-current arc welder which is adapted to be supplied from a polyphase source is disclosed. This welder, on the whole, operates highly satisfactorily, but it is desirable that its cost and the cost of the maintenance and service which it requires be substantially reduced.

What has been said as regards the Croco welder is also applicable to alternating current welders. It is desirable that their cost and the cost of maintaining and servicing them be reduced.

It is accordingly an object of our invention to provide a direct-current or alternating current arc welder of relatively low cost which shall require a minimum of maintenance and servicing.

A more specific object of our invention is to provide a direct-current arc welder particularly adapted to be supplied from a polyphase source, the cost of which welder shall be low and the maintenance and servicing requirements of which shall be at a minimum.

In its broader aspects, our invention arises from the discovery that a substantial saving in cost may be effected in that portion of the welder disclosed in the Croco patent which includes the secondary 12 and the variable reactor 14. Since a similar component is included in alternating current welders, this aspect of our invention applies to direct current as well as to alternating-current welders. The item of cost and servicing demands involved in this portion of the apparatus can be seen from a consideration of Figs. 2 and 5 of the patent. It can be seen from these views that the secondary windings 12b and the reactor windings 38 are separate. Because of this, connectors 40 must be provided between these windings. Since the secondary windings 12b and the reactor windings 38 are relatively heavy, these connectors must be relatively heavy and substantial difficulty in installing and maintaining them arises even if, as is customary at present, the windings 12b and 38 are composed of copper. This difficulty is enhanced where the windings 12b and 38 are composed of aluminum. Under such circumstances, the problems of brazing or welding the conductors 40 to the aluminum wire, which is necessarily of greater diameter than the copper wire, becomes formidable and the practicability of maintaining for any long period an assembly with aluminum wires brazed or welded to connectors appears questionable.

It is accordingly an object of our invention to provide arc welding apparatus including a transformer and a variable reactor for use both in direct-current and alternating current welders in which the requirement of interposing connectors between the windings of the reactor and the transformer shall be eliminated.

A more specific object of our invention is to provide arc welding apparatus including a transformer and a reactor in which the transformer turns which are connected to the reactor are composed of aluminum and which shall not require a brazed or welded connector between the transformer and the reactor.

An ancillary object of our invention is to provide a transformer-reactor unit which shall not require a connector between the transformer and the reactor.

Another ancillary object of our invention is to provide a transformer-reactor unit in which the winding of the transformer and reactor shall be composed of aluminum and which shall not require a connector between the transformer and the reactor.

In accordance with our invention, we provide an arc welder including a transformer one or both of the winding components of which are wound as a single winding with the reactor. In the preferred practice of our invention, the secondary is so wound. We accordingly provide in an arc welder, a transformer reactor unit which includes at least one core of fixed reluctance and one core of variable reluctance. One of the windings, preferably the primary, encircles the core of fixed reluctance. Another winding which preferably includes the secondary and may be called the secondary-reactor has a substantial number of turns which encircle the variable reluctance core only; the remainder of its turns encircle both the variable reluctance core and the fixed reluctance core. The core legs are preferably so closely spaced that the primary and the reactor windings are separated only by a thin insulating barrier. We have found that an arc welder including such a transformer-reactor unit is of substantially lower cost than an arc welder as disclosed in Croco patent.

A substantial saving is effected by the elimination of the soldered or brazed connectors which are present in the earlier apparatus. A substantial saving is also effected in the coil wire, whether it is copper or aluminum, to the extent that a portion of the reactor windings are wound about both cores because the quarter winding which would otherwise be wound about the variable reluctance core on its side facing the fixed core are eliminated. The elimination of the necessity for brazed or welded joints between a transformer and a reactor makes practical the replacement of copper wires by aluminum wires, with a resulting substantial saving in cost of the windings. A substantial saving is also effected in the wire material, because the primary and reactor windings are near each other and the lengths of the turns which would extend between the reactor winding and the primary winding are eliminated.

The secondary-reactor structure with a number of the turns wound about the variable-reluctance core has the advantage that all the turns of the secondary-reactor, both those wound around the variable-reluctance core only and those wound about both cores, are effective as reactor turns. If certain of the turns were not wound around the variable reluctance core only, a larger number of secondary turns would be required to provide the necessary reactance in the arc circuit, the number of primary turns would be correspondingly higher for any given open-circuit voltage and the required quantity of winding material would be correspondingly higher; or, alternatively, it would be necessary to distort the design proportions of the transformer reactor. In either event performance, economy in design and use of material would be sacrificed. In other words if certain of the turns were not wound on the variable reluctance core only, the design rquirements would become rigid as to preclude a selection of volts per turn which would yield the highest economy and best performance. Thus the concept disclosed here allows economical proportioning of core and winding materials.

The novel features that we consider characteristic of our invention are set forth generally above. Our invention itself, however, together with additional objects and advantages thereof may be understood from the following description of a specific embodiment when read in connection with the accompanying drawings, in which:

Figure 1 is a view partly in side elevation and partly in transverse section of apparatus in accordance with our invention, with one side of a housing removed to show the interior and with certain parts broken away to show details;

Fig. 2 is a view in cross section along line II—II of Fig. 1;

Fig. 3 is a diagram showing the winding arrangement of a transformer reactor in accordance with our invention;

Fig. 4 is a diagrammatic view showing a variable reluctance core used in the practice of our invention;

Fig. 5 is a circuit diagram of an arc welder in accordance with our invention;

Fig. 6 is a diagram showing a modification of our invention; and

Fig. 7 is a diagram showing another modification of our invention.

The mechanical structure of the apparatus disclosed in this application is, to a large extent, similar to the mechanical structure of the apparatus disclosed in the Croco patent and while the description included in the present application is in itself adequate for an understanding of our invention, it may be desirable for a more adequate understanding of this application that the reader familiarize himself with the Croco patent. Thus Fig. 1 of the present application is similar to Fig. 2 of the Croco patent, except that in the former the parts are rearranged and mounted somewhat differently than in the latter and the former discloses in its lower portion the novel transformer-reactor arrangement which constitutes the heart of the present invention rather than the transformer arrangement of the Croco application. To the extent that additional disclosure may at any time be found desirable or necessary, the Croco patent is made a part hereof for such showing.

The apparatus shown in Figs. 1 and 2 of the present application includes a housing 17 within which is mounted a polyphase transformer-reactor TR comprising a three-legged closed core CF of fixed reluctance and a three-legged open core CV of variable reluctance. Both cores are made up of the usual magnetized laminations.

The fixed core CF is made up of cross lamination strips C1 and C2 which are joined by legs L1, L2 and L3 and is held together by angle strips 6 which engage the core CF at four longitudinal corners along its whole length. The strips are secured to channels 7 which extend along the height of the container 17 and are supported by ears 102 on the base 100 and attached by ears 8 and eyebolts 11 to the top 9 of the container 17.

The variable reluctance core CV is made up of two parallel parts CV1 and CV2 each of which includes a lower fixed lamination assembly A1 having cross lamination strip C3 from which stub legs LS1, LS2 and LS3 project. A movable upper lamination assembly A2 having a cross strip C4 from which legs L4, L5 and L6 extend cooperates with the lower assembly A1 of each part CV1 and CV2.

The fixed core CF is supported on the base structure 15 which is secured to channels 7. The lower assembly A1 of the variable core CV is supported from a metallic bar 116 preferably of steel which is bolted by bolts passing transversely through the lower assembly A1. The bar 116 is secured at its ends to the channels 7. The bar 116 has at each end a cylindrical opening perpendicular to the base of the assembly A1 and centrally disposed with reference to the end legs LS1 and LS3. In these openings thrust bearings 18 are provided.

The upper assembly A2 of variable reluctance core CV is supported by a bar 12 preferably of steel which extends between the valves (CV1 and CV2) of this assembly near the cross lamination C4 and is bolted to the halves of assembly A2 by bolts which pass transversely through the assembly A2. The bar 12 has a pair of threaded openings transverse to the long dimension of the assembly A2 and approximately centrally disposed with reference to the legs L4 and L6 and is supported from threaded shafts 14 and 16 which are screwed into the openings. The shafts 14 and 16 each passes through an opening in a spacer 30 between the legs L4 and L6 and is supported from a thrust bearing 18 provided in bar 116, each bearing engaging a shoulder 19 on shafts 14 and 16. The shaft 14 extends through the top 9 and is rotatable by crank 32. The shafts 14 and 16 extend through the bar 116 beyond the shoulders 19 and the shaft 16 is coupled to the shaft 14 by a sprocket wheel and chain 34. Operation of the crank 32 causes shafts 14 and 16 to rotate which in turn move bar 12 and with it the assembly A2 up or down. Thus air gap 36 of any desired length within reasonable limits may be maintained between legs L4, L5 and L6 and legs LS1, LS2 and LS3 respectively. The bar 12 is guided in its movement between guides at its ends which consist of oppositely disposed angles 38 secured to the channels 7 and extending along the distance over which the bar 12 is to move.

An indicating dial 40 for indicating the angular position of the shafts 14 and 16 is provided. This dial is coupled to the shaft 14 by a speed reducing gear train (not shown).

The primary of the transformer reactor includes three coils P1, P2, P3, one each encircling a corresponding leg L1, L2, L3 of the fixed core CF and supported on the cross lamination C1. Each primary P1, P2, P3 may be (and usually is) made up of a plurality of sections adapted to be connected in series or in parallel. To facilitate the understanding of this invention only single section primaries are shown. The secondary reactor includes three windings SR1, SR2 and SR3 (which may also be made up in section). A portion of the turns of each secondary-reactor winding TV1, TV2, TV3 are wound about the legs L4–LS1, L5–LS2, and L6–LS3 of the variable reluctance core CV and the remainder of the turns of which T1, T2, T3 are wound about both the variable reluctance legs L4–LS1, L5–LS2 and L6–LS3 and corresponding fixed reluctance legs L1, L2 and L3, respectively. The secondary reactor coils SR are supported on the cross laminations C1 and C3. The legs L1, L2, L3 of the fixed reluctance core CF and L4–LS1, L5–LS2, L6–LS3 of the variable reluctance core CV are so closely spaced that the primary windings P1, P2, P3 are as near as practicable to the secondary reactor turns TV1, TV2, TV3 respectively. In fact the former are separated from the latter only by a thin insulated barrier 42.

While the ratio of the turns TV1, TV2, TV3 wound about the variable reluctance legs only to the total number of secondary reactor turns SR1, SR2, SR3 may be of any desired magnitude to suit different design requirements, in the preferred practice of our invention the number of turns wound about the variable reluctance legs is from 30% to 40% of the total number of secondary-reactor turns.

The windings P1, P2, P3, SR1, SR2 and SR3 may be composed of copper, but it is an important feature of our invention that all of them or only the windings SR1, SR2 and SR3 may be composed of aluminum. The dimensions of the openings in the portions TV1, TV2 and TV3 of the secondary-reactor windings SR1, SR2, SR3 which encircle the legs L4–LS1, L5–LS2 and L6–LS3 of the variable reluctance core CV are such as to permit the core assembly A2 to move through the interior of these portions to vary the air gap between the legs L4, L5, L6 and LS1, LS2, LS3, respectively.

Each primary P1, P2, P3 is connected through leads 46 to terminals on a terminal block 48 supported from one of the strips 6. (Where the primaries are in sections the leads 46 are the leads from the different sections.) The terminals 48 are interconnected in accordance with the preferred practice of our invention as shown in Fig. 5 so that the primaries P1, P2, P3 are in delta. The apices of the delta are adapted to be connected to power supply conductors.

The output conductors 52 of the secondary-reactor coils or windings SR1, SR2 and SR3 are connected together preferably at the rectifier 56 terminals into a delta as shown in Fig. 5. The apices of the delta are connected to the junctions of the rectifiers 56a–56b, 56c–56d, 56e–56f.

The detailed structure of the rectifier assembly 56 does not concern the present invention and is not discussed in detail in this application. Analogous assembly is shown and discussed in detail in the Croco patent.

Generally, the assembly 56 comprises a plurality of dry rectifier units 56a through 56f mounted on a strip 58 which is supported by angles 60 in turn secured to a large angle 62 mounted on the base 100. The rectifiers 56a through 56f are interconnected as shown in Fig. 5, one group 56a, 56c, 56f being connected to conduct current of one polarity from the apices of the delta SR1, SR2, SR3 and the other 56G, 56D, 56F being connected to conduct current of the opposite polarity. The rectifier groups 56a, c, e and 56b, d, f are connected each through a conductor 66 to a receptacle 68 into which plugs from the welding electrode and the work may be plugged.

The apparatus is cooled by a blower 79 which is rotated by a motor 81 suspended from one of the channels 7. The blower draws air through the base of the container 17. The air is deflected by a baffle 83 suspended from the channel 7 so that it passes over the transformer-reactor TR.

The apparatus in accordance with our invention is preferably connected as shown in Fig. 5. The primaries P1, P2, P3 are connected in a delta network, the apices of which are provided with conductors for connection to a suitable power supply. The secondary reactor windings SR1, SR2 and SR3 are also connected in delta and apices of the delta are connected each to a pair of rectifiers 56a, 56c and 56e and 56b, 56d and 56f, the former being adapted to conduct current of one polarity and the latter of the opposite polarity. Depending on the polarity at which it is desired that the current be conducted between the welding electrode E and the work W, the remaining terminals 68 of either one or the other of the rectifiers is connected to the electrode and the other one to the work. In Fig. 5 the electrode E is shown as positive and the work as negative.

In operation, the primary windings P1, P2, and P3 are connected through the associated power supply conductors to a suitable three-phase source. The circuit breaker connections (not shown) between the source and the windings are closed and voltage is impressed between the electrode E and the work W. A welding operation may be initiated by contacting the electrode E and the work W and producing an arc. The arc may then be maintained in the usual manner, producing a weld by melting the electrode E alone, by melting the work alone, or by melting an introduced additional filler rod.

The invention as disclosed herein is shown as applied to a three-phase direct-current arc welding system. Our invention in its broadest aspects is not limited with respect to phase number. It is applicable to single phase in which case an arc welder having a transformer-reactor such as that disclosed above with the primary and secondary windings each connected in series or parallel can be provided. Such a single phase structure with two legged fixed and variable reluctance cores 1CF and 1CV respectively is shown schematically in Fig. 6. In this case the primary windings P4 and P5 are shown as connected in series and the secondary-reactor windings SR4 and SR5 in parallel. The core structure is similar to that shown for the three-phase rectifier welder. The phase number could also be higher than three in which case the fixed and variable reluctance cores could have more than three legs or more than one set of windings could be wound on each of the legs.

Our invention is also applicable to a single-phase system in which the transformer-reactor unit has only a single set of windings. This set of windings could be wound on a single legged core. Such a structure is shown in Fig. 7. In this view the variable reluctance core 2CV consists of a single leg LS7 movable with respect to the fixed reluctance core 2CF. The primary P6 is wound on the leg L7 of the fixed core 2CF and the secondary-reactor SR6 includes a portion wound about the leg LS7 only and the remainder with both about leg LS7 and leg L7.

Nor is our invention limited to the specific winding structure disclosed. Thus, instead of the secondary, the primary could be wound as a primary reactor, in which case a portion of the turns of the primary reactor would be wound about the variable reluctance core legs and the remainder of the turns both about the variable reluctance core legs and the fixed reluctance core legs. In addition, both the primary and secondary could be wound as primary-reactor and secondary-reactor. In this case, each of the windings would consist of a number of turns about the legs of a variable reluctance core and the remainder of the windings about the legs of the variable reluctance core and the fixed reluctance core.

The structure of the variable reluctance core, in accordance with the broader aspects of our invention, need not be specifically as shown in the drawing. The adjustable air gaps may, for example, be replaced by fixed air gaps joined by a movable bridge or by a fixed air gap between which a cam shaped magnetic member is rotated to set the reluctance.

It appears then that while we have shown and described a certain embodiment of our invention, many modifications thereof are possible. Our invention, therefore, is to be limited only insofar as is necessitated by the spirit of the prior art.

We claim as our invention:

1. A transformer-reactor unit comprising in combination a closed magnetic core having a plurality of continuous legs, an open magnetic core having a plurality of legs each interrupted by an air gap, means for mounting said cores adjacent each other so that a continuous leg is adjacent a corresponding interrupted leg, a first winding associated with each said continuous leg and encircling only its corresponding continuous legs, and a second winding associated with each said interrupted leg and its corresponding continuous leg and having a substantial number of turns encircling only said associated interrupted leg and the remainder of its turns encircling both said associated continuous leg and said corresponding interrupted leg.

2. A transformer reactor unit comprising in combination a first core of fixed magnetic reluctance having a plurality of legs, a second core of variable magnetic reluctance having a plurality of legs, means for mounting said cores so that a leg of said first core is adjacent a corresponding leg of said second core, a first winding associated with each of said plurality of legs of said first core and the corresponding leg of said second core, a second winding associated with each of said plurality of legs of said first core and the corresponding leg of said second core, means for mounting each of said first and second windings so that they are inductively coupled, at least one of said windings having a substantial number of its turns encircling one of the associated legs of one core and the remainder of its turns encircling both said last named associated leg and its corresponding leg of said other core and means for connecting said one winding in a polygonal network.

3. In combination a first core of fixed magnetic reluctance having a plurality of legs, a second core of variable magnetic reluctance having a plurality of legs, means for mounting said cores so that a leg of said first core is adjacent a corresponding leg of said second core, a first winding associated with each of said plurality of legs of said first core and the corresponding leg of said second core, a second winding associated with each of said plurality of legs of said first core and the corresponding leg of said second core, means for mounting each of said first and second windings so that they are inductively coupled, at least one of said windings having a substantial number of its turns encircling one of the associated legs of one core and the remainder of its turns encircling both said last named associated leg and the corresponding leg of said other core, means for connecting said one winding in a polygonal network, first asymmetric means adapted to conduct current of one polarity connected to each apex of said network and second asymmetric means adapted to conduct current of the opposite polarity connected to each apex of said network.

4. A transformer-reactor unit comprising in combination, a first core having a plurality of legs connected in a magnetic circuit of substantially fixed magnetic reluctance, a second core having a plurality of legs connected in a magnetic circuit of variable magnetic reluctance, means for mounting said cores so that a leg of said first core is adjacent a corresponding leg of said second core, a first plurality of windings, each winding of said plurality associated with each of said plurality of legs of said first core and the corresponding leg of said second core, a second plurality of windings, each winding of said last-named plurality associated with each of said plurality of legs of said first core and the corresponding leg of said second core, and means for mounting each winding of said first and the associated winding of said second pluralities so that they are inductively coupled through said circuits, each winding of at least one of said pluralities having a substantial number of its turns encircling its associated leg of said second core and the remainder of its turns encircling both said last-named associated leg and its corresponding leg of said first core and being magnetically linked with said circuit of fixed reluctance, and each winding of said second plurality encircling only its associated leg of said first core.

5. A transformer-reactor unit comprising in combination a first core having a plurality of legs connected in a magnetic circuit of substantially fixed magnetic relutance, a second core having a plurality of legs connected in a magnetic circuit of variable magnetic reluctance, means for mounting said cores so that a leg of said first core is adjacent a corresponding leg of said second core, a first plurality of windings, each winding of said plurality associated with each of said plurality of legs of said first core and the corresponding leg of said second core, a second plurality of windings, each winding of said last-named plurality associated with each of said plurality of legs of said first core and the corresponding leg of said second core, and means for mounting each of said first and second windings so that they are inductively coupled, each winding of at least one of said pluralities having a substantial number of its turns encircling its associated leg of said second core and the remainder of its turns encircling both said last-named associated leg and its corresponding leg of said first core and being magnetically linked with said circuit of fixed reluctance, and the windings of each of the other of said pluralities encircling only its associated leg of said first core.

6. A transformer-reactor unit comprising in combination a closed magnetic core having a plurality of continuous legs, an open magnetic core having a plurality of legs each interrupted by an air gap, means for mounting said cores adjacent each other so that a continuous leg is adjacent a corresponding interrupted leg, a first winding associated with each said continuous leg and encircling only its corresponding continuous leg, a second winding associated with each said interrupted leg and its corresponding continuous leg and having a substantial number of turns encircling only said associated interrupted leg and the remainder of its turns encircling both said associated continuous leg and said corresponding interrupted leg and means connected to said interrupted legs for varying its associated air gap to vary the reluctance of said open core.

7. A transformer-reactor unit comprising in combination a magnetic circuit of substantially fixed reluctance having at least one leg, a magnetic circuit of variable reluctance having at least one leg, a first winding having all of its turns only about said one leg of said fixed reluctance circuit, and a second winding having a substantial number of its turns about said one leg of said variable reluctance circuit and the remainder of its turns about both, said last-named leg of said fixed reluctance circuit and said last-named leg of said variable reluctance circuit, said last-named turns magnetically linking said magnetic circuit of fixed reluctance, the number of turns about said leg of said variable reluctance circuit being such that said last-named turns introduce substantial reactance in said winding, said reactance being variable over a wide range as said variable reluctance is varied.

8. A transformer-reactor unit comprising in combination a magnetic circuit of substantially fixed magnetic reluctance having at least one leg, a magnetic circuit of variable magnetic reluctance having at least one leg, a first winding having all of its turns only about said one leg of said fixed reluctance circuit, and a second winding having a substantial number of its turns about said one leg of said variable reluctance circuit and the remainder of its turns about both, said last-named leg of said fixed reluctance circuit and said last-named leg of said variable reluctance circuit, said last-named turns magnetically linking said fixed reluctance circuit, at least said second winding being composed of aluminum, the number of turns about said leg of said variable reluctance circuit being such that said last-named turns introduce substantial reactance in said winding, said reactance being variable over a wide range as said variable reluctance is varied.

9. A transformer-reactor unit comprising in combination a magnetic circuit of substantially fixed magnetic reluctance having at least one leg, a magnetic circuit of variable magnetic reluctance having at least one leg, a first winding having all of its turns only about said one leg of said fixed reluctance circuit, and a second winding having a substantial number of its turns about said one leg of said variable reluctance circuit and the remainder of its turns about both said last-named leg of said fixed reluctance circuit and said last-named leg of said variable reluctance circuit, said legs being so spaced that said first winding is as near as practicable to said second winding, the number of turns about said leg of said variable reluctance circuit being such that said last-named truns introduce substantial reactance in said winding, said reactance being variable over a wide range as said variable reluctance is varied.

10. A transformer-reactor unit comprising in combination a magnetic circuit of substantially fixed magnetic reluctance having at least one leg, a magnetic circuit of variable magnetic reluctance having at least one leg, a first winding having all of its turns only about said one leg of said fixed reluctance circuit, and a second winding having at least a substantial number of its turns about both said last-named leg of said fixed reluctance circuit and said last-named leg of said movable reluctance circuit, said last-named turns magnetically linking said fixed reluctance circuit at least said second winding being composed of aluminum, the number of turns about said leg of said variable reluctance circuit being such that said last-named turns introduce substantial reactance in said winding, said reactance being variable over a wide range as said variable reluctance is varied.

11. A transformer-reactor unit comprising a magnetic circuit of substantially fixed magnetic reluctance having a plurality of legs, a magnetic circuit of variable magnetic reluctance having a plurality of legs, a first winding encircling only each leg of said fixed reluctance circuit, a second winding associated with each leg of said fixed reluctance circuit and a corresponding leg of said variable reluctance circuit and having a portion of its turns encircling only said corresponding leg of said variable reluctance circuit and the remainder of its turns encircling both the associated leg of said fixed reluctance circuit and the corresponding leg of said variable reluctance circuit, and means for connecting said first windings in series and said second windings in parallel.

12. A transformer-reactor unit comprising a magnetic circuit of substantially fixed magnetic reluctance having a plurality of legs, a magnetic circuit of variable magnetic reluctance having a plurality of legs, a first winding encircling only each leg of said fixed reluctance circuit, a second winding associated with each leg of said fixed reluctance circuit and a corresponding leg of said variable reluctance circuit and having a portion of its turns encircling only said corresponding leg of said variable reluctance circuit and the remainder of its turns encircling said corresponding leg of said fixed reluctance circuit and the corresponding leg of said variable reluctance circuit and means for connecting said first windings in series.

13. A transformer-reactor unit comprising a closed magnetic circuit of substantially fixed reluctance having at least one leg, a magnetic circuit of variable reluctance having at least one leg, a first winding magnetically linked only to said leg of said circuit of fixed reluctance and a second winding, the said unit being characterized by the fact that said second winding has a number of turns magnetically linked only with said leg of said circuit of variable reluctance, the remainder of its turns being magnetically linked both with said leg of said circuit of fixed reluctance and said leg of said circuit of variable reluctance, the number of turns about said leg of said variable reluctance circuit being such that said last-named turns introduce substantial reactance in said winding, said reactance being variable over a wide range as said variable reluctance is varied.

14. A transformer-reactor unit comprising in combination a closed magnetic core having a plurality of continuous legs, an open magnetic core having a plurality of legs each interrupted by an air gap, means connected to said interrupted legs for varying their associated gaps to vary the reluctance of said open core, a first winding associated with each said continuous leg and encircling only its corresponding continuous leg and a second winding associated with each said interrupted leg and its corresponding continuous leg and having a substantial number of turns encircling only said associated interrupted leg and the remainder of its turns encircling both said associated continuous leg and said corresponding interrupted leg.

15. A transformer-reactor unit comprising in combination a magnetic circuit of substantially fixed magnetic reluctance having at least one leg, a magnetic circuit of variable magnetic reluctance having at least one leg interrupted by a variable-width air gap, the reluctance of said variable reluctance circuit depending on the width of said gap, a first winding having all of its turns about only said one leg of said fixed reluctance circuit, and a second winding having at least a substantial number of its turns about both said last-named leg of said first reluctance circuit and said last-named leg of said variable reluctance circuit, said last-named turns magnetically linking said fixed reluctance circuit, at least said second winding being composed of aluminum, the number of turns about said leg of said variable reluctance circuit being such that said last-named turns introduce substantial reactance in said winding, said reactance being variable over a wide range as said variable reluctance is varied.

16. A transformer-reactor unit comprising in combination a first core having a plurality of legs connected in a magnetic circuit of substantially fixed magnetic reluctance, a second core having a plurality of legs, each of said last-named legs being interrupted by a variable-width air gap and said interrupted legs being connected in a magnetic circuit of variable magnetic reluctance, the magnitude of said variable reluctance depending on the width of each said gap, means for mounting said cores so that a leg of said first core is adjacent a corresponding leg of said second core, a first plurality of windings, each winding of said plurality associated with each of said plurality of legs of said first core and the corresponding leg of said second core, a second plurality of windings, each winding of said last-named plurality associated with each of said plurality of legs of said first core and the corresponding leg of said second core, and means for mounting each of said first and second windings so that they are inductively coupled, each winding of at least one of said pluralities having a substantial number of its turns encircling its associated leg of said second core and the remainder of its turns encircling both said last-named associated leg and its corresponding leg of said first core and being magnetically linked with said circuit of fixed reluctance, and the windings of each of the other of said pluralities encircling only its associated leg of said first core.

17. A transformer-reactor unit comprising in combination a magnetic circuit of substantially fixed magnetic reluctance having at least one leg, a magnetic circuit of variable magnetic reluctance having at least one leg interrupted by a variable-width air gap, the reluctance of said variable reluctance circuit depending on the width of said gap, a first winding having all of its turns only about said one leg of said fixed reluctance circuit, and a second winding having at least a substantial number of its turns about both said last-named leg of said fixed reluctance circuit and said last-named leg of said variable reluctance circuit, said last-named turns magnetically linking said fixed reluctance circuit, at least said second winding being composed of aluminum, the number of turns about said leg of said variable reluctance circuit being such that said last-named turns introduce substantial reactance in said winding, said reactance being variable over a wide range as said variable reluctance is varied.

18. Welding apparatus including a welding transformer comprising; a plurality of primary windings, a secondary and reactance winding means for each primary winding, magnetic core means linking each primary winding to the pertaining secondary and reactance winding means, a full wave rectifier for converting the output of said secondary and reactance winding means to direct current, said secondary and reactance winding means including variable reactance means in the secondary circuit, said secondary and reactance winding means being connected in delta whereby said reactance means is connected in the legs of said delta with the rectifier being connected to the corner of the delta.

References Cited in the file of this patent

UNITED STATES PATENTS

| | | |
|---|---|---|
| 865,985 | Bains | Sept. 17, 1907 |
| 2,437,021 | Fries | Mar. 2, 1948 |
| 2,640,164 | Giel et al. | May 26, 1953 |
| 2,644,109 | Mulder | June 30, 1953 |
| 2,738,458 | Walsh | Mar. 13, 1956 |